United States Patent [19]
Stark et al.

[11] 3,854,247
[45] Dec. 17, 1974

[54] SEALING STRIP FOR MOTOR VEHICLES

[75] Inventors: Karl Stark, Sindelfingen; Werner Achterwinter; Karl-Heinz Brauer, Sindelfingen, all of Germany

[73] Assignee: Daimler-Benz Aktiengesellschaft, Stuttgart-Unterturkheim, Germany

[22] Filed: June 6, 1969

[21] Appl. No.: 831,173

[30] Foreign Application Priority Data
June 6, 1968 Germany.......................... 1755665

[52] U.S. Cl..................... 49/495, 49/496, 161/118, 161/123
[51] Int. Cl............................................ E06b 7/23
[58] Field of Search ............ 49/496, 495, 489, 485, 49/484, 475; 161/125, 128, 118, 123; 277/207, 208, 209

[56] References Cited
UNITED STATES PATENTS

| | | | |
|---|---|---|---|
| 2,041,946 | 5/1936 | Nave.................................... | 49/489 |
| 2,322,867 | 6/1943 | Meyer.......................... | 277/207 UX |
| 2,701,395 | 2/1955 | Barroero.............................. | 49/495 |
| 2,705,655 | 4/1955 | Brown et al. ..................... | 49/495 X |
| 2,793,070 | 5/1957 | Wernig ............................. | 49/485 X |
| 2,833,589 | 5/1958 | Ahrens............................. | 49/485 X |
| 3,357,137 | 12/1967 | Lombardi et al. ................ | 49/485 X |

FOREIGN PATENTS OR APPLICATIONS

| | | | |
|---|---|---|---|
| 150,255 | 9/1920 | Great Britain...................... | 277/207 |
| 635,771 | 4/1950 | Great Britain...................... | 277/207 |

*Primary Examiner*—Philip C. Kannan
*Attorney, Agent, or Firm*—Craig & Antonelli

[57] ABSTRACT

A sealing strip made from an elastomeric material for installation at doors or the like in motor vehicles in which the sealing lip is provided with recesses extending into the material from the abutment surface and placed closely adjacent one another in order to reduce noises.

22 Claims, 4 Drawing Figures

PATENTED DEC 17 1974

3,854,247

INVENTORS
KARL STARK
WERNER ACHTERWINTER
KARL-HEINZ BRAUER

BY Craig, Antonelli, Stewart & Hill
ATTORNEYS

SEALING STRIP FOR MOTOR VEHICLES

The present invention relates to a sealing strip of an elastomeric material at doors of motor vehicles, which with a closed door abuts with a sealing lip at a painted metal part.

Sealing strips of this type which are intended to prevent the penetration of water and dust into the vehicle body, produce during the drive of the motor vehicle by reason of the unavoidable relative movements between the door and the vehicle body, noises which are noticed and felt unpleasantly. In particular, the sealing strip sections which are arranged in the glass-enclosed part of the door produce noises which, by reason of the proximity to the hearing range of the vehicle passengers, are considered as very obnoxious.

The present invention therefore aims to so construct sealing strips at doors that relative movements between the abutment surface of the seal and the painted sheet metal surface do occur and noises are thus avoided.

The underlying problems are solved in accordance with the present invention in that the sealing lip of the sealing strip is provided either completely or partly on its abutment side with recesses starting from the surface which are arranged adjacent one another.

By the arrangement of the recesses is achieved that no surface contact but only a line contact exists. This construction makes it possible that the relative movements of the door with respect to the vehicle body section no longer lead to forceful displacements of the rubber surface on the painted sheet metal surface but instead are elastically absorbed within the webs.

In an advantageous construction of the inventive concept, the recesses may be about three-tenths of a millimeter deep and the largest diameter of the recesses in the surface of the sealing lip may amount to about six-tenths of a millimeter.

Furthermore, the recesses may have a conical or pyramidlike shape and may be so arranged that the surface of the sealing lip has a honey-combed hexagonal shape of the webs defining the same. It is achieved thereby that the webs, with a view to the necessary sealing action, are connected with each other.

The sealing strip can be constructed as a molded part of foam rubber with closed pores or as soft-rubber, molded part or also as synthetic rubber part.

Accordingly, it is an object of the present invention to provide a sealing strip for motor vehicles which avoids by simple means the aforementioned shortcomings and drawbacks encountered in the prior art.

Another object of the present invention resides in a sealing strip for motor vehicles, especially at the doors of motor vehicles, which effectively eliminates noises during the drive of the vehicle.

A further object of the present invention resides in a sealing strip for the doors of motor vehicles which is simple in construction, easy to manufacture and install and effective in minimizing noises that occur during relative movements between the parts involved.

These and further objects, features and advantages of the present invention will become more according from the following description when taken in connection with the accompanying drawing which shows for purposes of illustration only, one embodiment in accordance with the present invention, and wherein.

Figure 1:
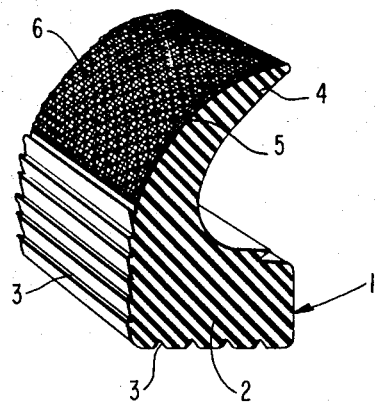
FIG. 1 is a perspective view of a part of a sealing strip, according to the present invention, on an enlarged scale.

Referring now to the drawing wherein like reference numerals are used throughout the various views to designate like parts, the sealing strip 1 according to FIG. 1 is a foam-rubber molded part and is constructed with a base portion 2 approximately rectangular in cross section, into whose bottom and larger side surface are cut mounting and holding grooves 3. The sealing lip 4 projects from the base portion 2 upwardly with a slight curvature. The sealing strip 1 is provided over the entire circumference with an enclosed outer covering.

Figure 2:
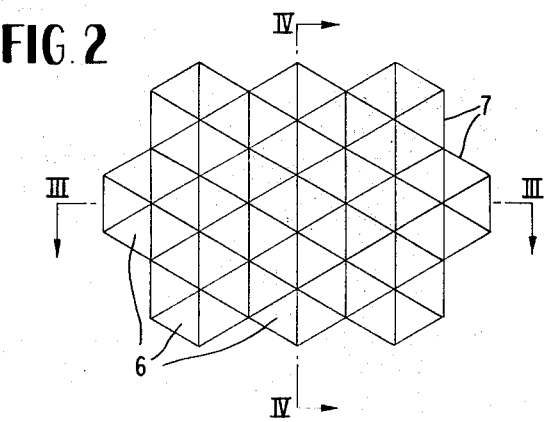
FIG. 2 is a plan view on the surface of the sealing lip of the sealing strip of FIG. 1, showing the same on a greatly enlarged scale.
Figure 4:
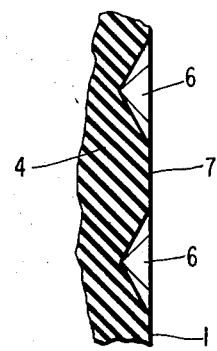
FIG. 4 is a cross-sectional view through the sealing strip taken along line IV—IV of FIG. 2.
Figure 3:
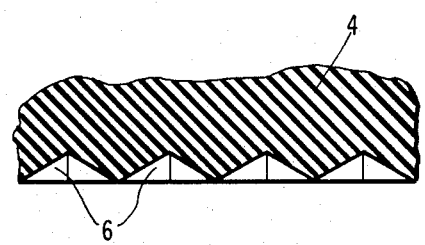
FIG. 3 is a cross-sectional view through the sealing strip taken along line III—III of FIG. 2.

The surface 5 of the sealing lip 4 forms the abutment side. It is, as is particularly clear from FIGS. 2 to 4, provided with a plurality of recesses 6 arranged closely adjacent one another which are constructed similar to a hexagonal pyramid. The edges 7 of these recesses 6 form regular hexagonals and are so arranged adjacent one another that the surface 5 assumes a honeycombed character.

The greatest width of the recesses 6 in the surface 5 amounts to about six-tenths of a millimeter and the depth to about three-tenths of a millimeter.

Possibly, in addition to doors, also lids, hoods or the like at a vehicle body may be sealed by means of a sealing strip according to the present invention. Furthermore, it is also possible to provide other rubber parts having friction surfaces which are under pressure, for example, bumpers, with recesses according to the present invention in order to eliminate rubber noises.

While we have shown and described only one embodiment in accordance with the present invention, it is understood that the same is not limited thereto but is susceptible of numerous changes and modifications as known to a person skilled in the art, and we therefore do not wish to be limited to the details shown and described herein, but intend to cover all such changes and modifications as are within the scope of those skilled in the art.

We claim:

1. A sealing strip made from an elastomeric material for use in doors or the like of motor vehicles which, with a closed door, abuts with a sealing lip means thereof at a painted metal part, said sealing lip means being provided, at least partially on its abutment side, with recess means emanating from the surface thereof, characterized in that said recess means includes a plurality of depressions of minor width which are arranged approximately in mesh form in closely spaced serial relationship such that during use the only contact between the abutment side and the painted metal part is along thin abutment lines formed by the edges of the depressions whereby noises due to relative movement of the painted part and the sealing strip are reduced, and characterized in that the depressions have a pyramid-like shape.

2. A sealing strip according to claim 1, characterized in that respective abutment lines surround each of said recesses to form an equilateral polygon.

3. A sealing strip according to claim 1, characterized in that the sealing lip means is provided with recess means over the entire abutment side thereof.

4. A sealing strip according to claim 1, characterized in that the sealing strip is constructed as foam rubber molded part with closed pores.

5. A sealing strip according to claim 1, characterized in that the sealing strip is constructed as soft-rubber molded part.

6. A sealing strip according to claim 1, characterized in that the sealing strip is constructed as synthetic rubber part.

7. A sealing strip according to claim 1, characterized in that the largest diameter of a depressions in the surface of the sealing lip means amounts to about six-tenths of a millimeter.

8. A sealing strip according to claim 1, characterized in that the depressions are about three-tenths of a millimeter in depth.

9. A sealing strip according to claim 8, characterized in that the largest diameter of a depressions in the surface of the sealing lip means amounts to about six-tenths of a millimeter.

10. A sealing strip made from an elastomeric material for use in doors or the like of motor vehicles which, with a closed door, abuts with a sealing lip means thereof at a painted metal part, said sealing lip means being provided, at least partially on its abutment side, with recess means emanating from the surface therof, characterized in that said recess means includes a plurality of depressions of minor width which are arranged approximately in mesh form in closely spaced serial relationship such that during use the only contact between the abutment side and the painted metal part is along thin abutment lines formed by the edges of the depressions whereby noises due to relative movement of the painted part and the sealing strip are reduced, and characterized in that the recess means are so arranged that the surface of the sealing-lip means has a honey-combed hexagonal shape of the webs defining the same.

11. A sealing strip means according to claim 10, characterized in that the depressions have a cone-like shape.

12. A sealing strip according to claim 10, characterized in that the depressions have a pyramid-like shape.

13. A sealing strip according to claim 10, characterized in that the depressions are about three-tenths of a millimeter in depth.

14. A sealing strip according to claim 13, characterized in that the largest diameter of a depression in the surface of the sealing lip means amounts to about six-tenths of a millimeter.

15. A sealing strip made from an elastomeric material for use in doors or the like of motor vehicles where the sealing strip abuttingly engages a vehicle metal part; said sealing strip comprising: sealing lip means having an abutment side for engagement with the metal part and a base section for fixedly attaching the sealing strip to another vehicle part arranged adjacent the metal part, said abutment side including a plurality of closely spaced serially arranged recesses separated by thin abutment lines formed by the edges of said recesses, said recesses being so arranged on said abutment side that the only contact between the sealing lip means and the metal part is along said thin abutment lines whereby noises due to relative movement of the metal part and the sealing strip are minimized, and characterized in that respective abutment lines surround each of said recesses to form an equilateral polygon.

16. A sealing strip according to claim 15, characterized in that said sealing lip means is of a curved C-shaped configuration in an unstretched condition, the bottom part of the C being formed by the base section, and in that said abutment side is on the outwardly facing surface of the sealing lip means.

17. A sealing strip according to claim 15, characterized in that each of said recesses are similar to one another and in that said polygon is a hexagon.

18. A sealing strip according to claim 17, characterized in that the surface of each of said recesses are formed by a plurality of planar surface sections such that the recess has a pyramid-like shape with a maximum depth of approximately three-tenths of a millimeter and a maximum width of approximately six-tenths of a millimeter.

19. A sealing strip according to claim 15, characterized in that said sealing lip means and base section are of one-piece construction, said base having a substantially rectangular cross-section with said sealing lip means tapering upwardly to a point above one of the sides of the base section.

20. A sealing strip according to claim 19, characterized in that said base section has longitudinally extending grooves for engaging corresponding parts on the vehicle to hold the sealing strip in place.

21. A sealing strip according to claim 15, characterized in that each of said recesses are similar to one another and in that said polygon is a hexagon.

22. A sealing strip according to claim 21, characterized in that the surface of each of said recesses are formed by a plurality of planar surface sections such that the recess has a pyramid-like shape with a maximum depth of approximately three-tenths of a millimeter and a maximum width of approximately six-tenths of a millimeter.

* * * * *